United States Patent
Knutson et al.

(10) Patent No.: US 8,965,210 B2
(45) Date of Patent: Feb. 24, 2015

(54) DIRECTIONAL REMOTE CONTROL

(75) Inventors: Paul Gothard Knutson, Westfield, IN (US); Saurabh Mathur, Monmouth Junction, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 90 days.

(21) Appl. No.: 13/808,316

(22) PCT Filed: Jul. 7, 2010

(86) PCT No.: PCT/US2010/001920
§ 371 (c)(1),
(2), (4) Date: Jan. 4, 2013

(87) PCT Pub. No.: WO2012/005716
PCT Pub. Date: Jan. 12, 2012

(65) Prior Publication Data
US 2013/0108275 A1    May 2, 2013

(51) Int. Cl.
| | | |
|---|---|---|
| *H04B 10/00* | (2013.01) | |
| *H04B 10/114* | (2013.01) | |
| *H04N 5/44* | (2011.01) | |
| *H04N 21/422* | (2011.01) | |
| *H04N 21/488* | (2011.01) | |
| *G08C 19/16* | (2006.01) | |

(52) U.S. Cl.
CPC ........ *H04B 10/1143* (2013.01); *G08C 2201/71* (2013.01); *H04N 5/4403* (2013.01); *H04N 21/42225* (2013.01); *H04N 21/4882* (2013.01); *G08C 19/16* (2013.01)

USPC .............................. 398/108; 398/66; 725/81

(58) Field of Classification Search
USPC ...................... 398/106–114, 66–73
See application file for complete search history.

(56) References Cited

U.S. PATENT DOCUMENTS

| 8,019,229 B2 * | 9/2011 | Fujiwara ....................... 398/172 |
|---|---|---|
| 2005/0200499 A1 | 9/2005 | Di Peppe |
| 2008/0056722 A1 * | 3/2008 | Hendrix et al. ............... 398/108 |
| 2008/0232811 A1 | 9/2008 | Milner et al. |
| 2009/0051823 A1 | 2/2009 | Tsurumoto et al. |
| 2010/0013695 A1 | 1/2010 | Hong et al. |
| 2010/0054745 A1 | 3/2010 | Lee |

FOREIGN PATENT DOCUMENTS

| EP | 1947621 | 7/2008 |
|---|---|---|
| EP | 1981012 | 10/2008 |
| JP | 2006279424 | 10/2006 |

OTHER PUBLICATIONS

Search Rept: Oct. 1, 2010.

* cited by examiner

*Primary Examiner* — Leslie Pascal
(74) *Attorney, Agent, or Firm* — Robert D. Shedd; Robert B. Levy

(57) ABSTRACT

A remote control unit generates a first beam which a user points at one of a plurality of information appliances to select that appliance. After selecting the desired appliance, the user then actuates a button on a control keypad on the remote control unit to cause the unit to generate a second, modulated beam. The remote control unit modulates the second beam in accordance with a desired functionality of the information appliance to control the appliance accordingly.

11 Claims, 10 Drawing Sheets

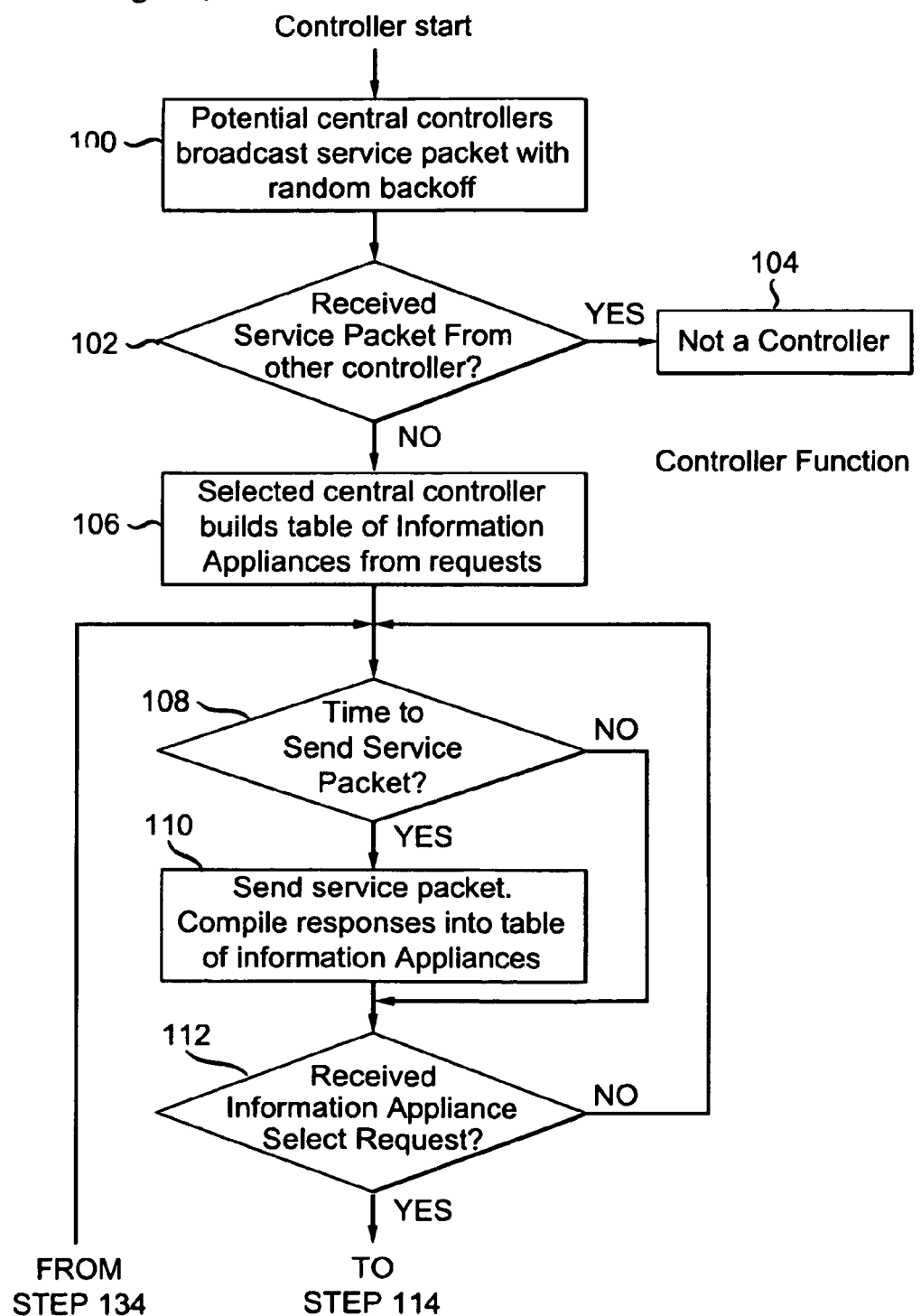

DIRECTIONAL REMOTE CONTROL

This application claims the benefit, under 35 U.S.C. §365 of International Application PCT/US2010/001920, filed Jul. 7, 2010, which was published in accordance with PCT Article 21(2) on Jan. 12, 2012 in English.

TECHNICAL FIELD

This invention relates to a remote control and a method of operating the same.

BACKGROUND ART

Remote control units have now become commonplace for operating various electronic devices, such as television sets, set top boxes, DVD players, audio amplifiers, and the like. Indeed, many consumers who have a combination of such consumer electronic devices connected together to form a home entertainment system find themselves frustrated with the need to find the appropriate remote control unit from among a collection of such units for controlling a specific device. Moreover, each consumer electronic device typically utilizes a remote control unit with its own keypad layout. Thus, the user must remember the features of each remote unit in order to operate the corresponding device controlled thereby.

To overcome this problem, several manufactures now offer a single remote control unit capable of operating a variety of different consumer electronic devices. Such combination remote units generally tend to suffer from high cost and complexity, especially with regard to the programming required to assure a proper interface between the remote control unit and each device controlled thereby. As a consequence, such remote control units have not enjoyed widespread acceptance by consumers.

Thus, a need exits for a remote control unit for controlling multiple consumer electronic devices which overcomes the aforementioned disadvantages.

BRIEF SUMMARY OF THE INVENTION

Briefly, in accordance with a preferred embodiment of the present principles, a method for controlling one of a plurality of devices commences by first receiving at one or more of the devices a beam of electromagnetic radiation. Upon receipt of the beam of electromagnetic radiation, the one or more devices receiving the radiation beam will generate an acknowledgement signal. One of the devices generating the acknowledgement signal gets selected and the selected device becomes enabled to receive a control signal for controlling that device.

BRIEF SUMMARY OF THE DRAWINGS

FIGS. 5A and 5B collectively depict in flow chart form the steps of a method executed by a controller for managing control of the information appliances of FIG. 1;

DETAILED DESCRIPTION

Figure 1:
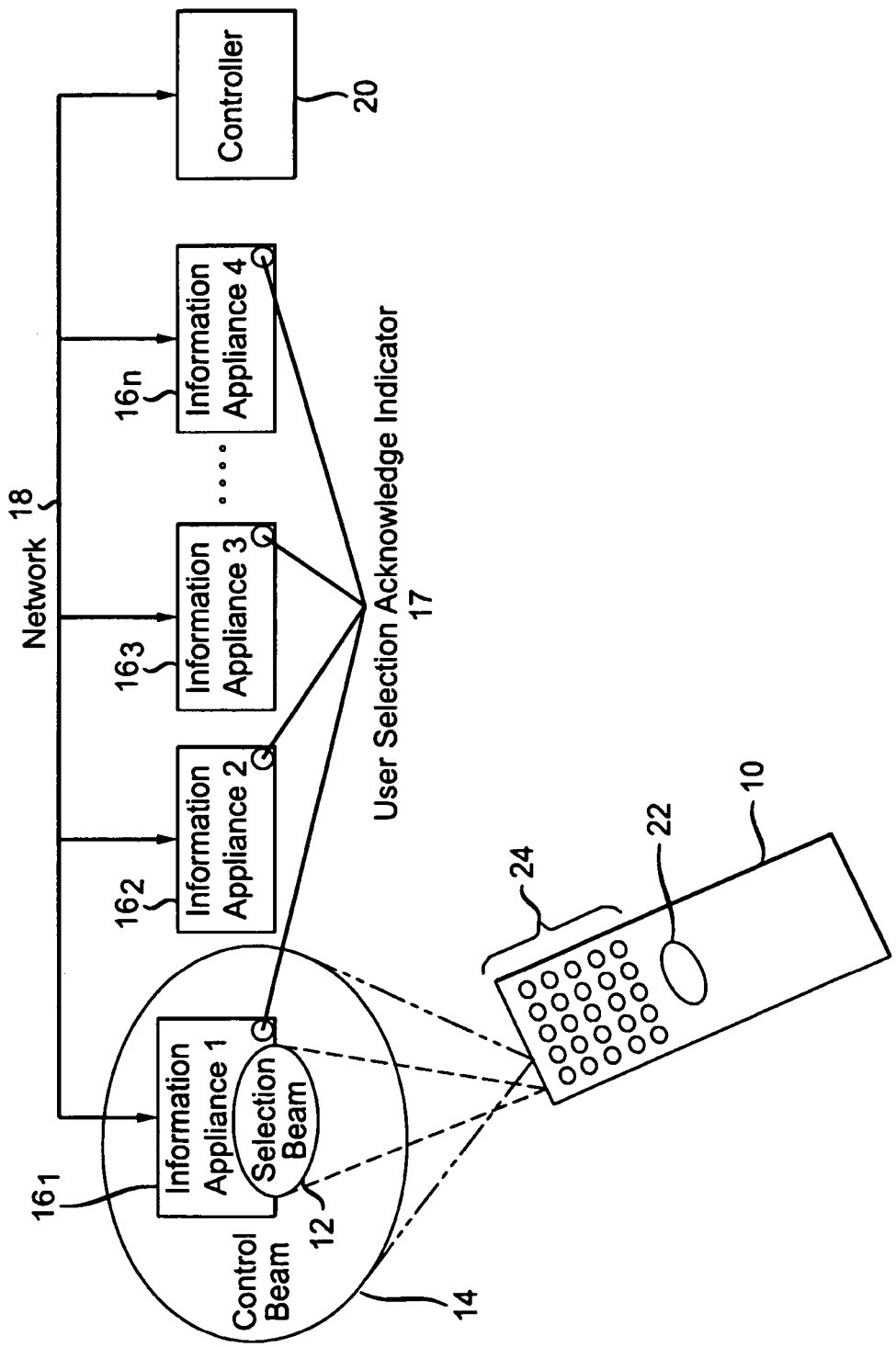
FIG. 1 depicts a block schematic diagram of a first embodiment of a remote control unit for controlling a plurality of information appliances.

As described in greater detail below, a remote control unit in accordance with the present principles enables a user to select and control individual information appliances by pointing a beam generated by the remote control unit at a device to select the same and thereafter sending control commands thereto via a control beam. FIG. 1 depicts a block schematic diagram of a first embodiment of a remote control 10 of the present principles. As depicted in FIG. 1, the remote control of 10 has the capability of generating two separate beams, a select beam 12 and a modulated control beam 14, both of which have a wavelength in the infrared spectrum. As described in greater detail below, the select beam 12 serves to select one of a plurality of information appliances, for example appliances $16_1, 16_2, 16_3 \ldots 16_n$ (where n is an integer greater than zero), each appliance having a detector 17 for detecting the select and modulated control beams 12 and 14, respectively. In practice, the information appliances comprise consumer electronic devices. For example, the information appliance $16_1$ could comprise a television set, whereas, information appliance $16_2$ could comprise a set top box, and information appliance $16_3$ could comprise a Digital Video Disc (DVD) player. Other such devices could include an audio amplifier, a radio tuner, as well as controllers for lights and drapes, as an example. The exact nature of each information appliance plays no importance, except that each information appliance needs to possess the ability to receive and respond to the select beam 12 and the modulated control beam 14.

A network 18 links the information appliances $16_1$-$16_n$ to each other. The network 18 comprises a wired or wireless network and can make use of one of a variety of different network protocols well known in the art. Configuring network 18 as a wireless network eliminates the need to link the information appliances $16_1$-$16_n$ by cables, a distinct advantage. In this regard, the network 18, when configured as a wireless network, could make use of the well known IEEE 802.11 protocol, although other wireless protocols could work just as easily.

An outboard controller 20 links the information appliances $16_1$-$16_n$ via the network 18. In practice, the controller 20 includes a processor (not shown) with associated memory for storing: (a) programming instructions, (b) data, and (c) input/output interfaces to enable the information appliances $16_1$-$16_n$ to exchange information under the control of the controller. The controller 20 performs several functions, including, but not limited to arbitration among two or more information devices selected by the user.

Still referring to FIG. 1, the remote control device 10 generates the select beam 12 in response to user actuation of a select button 22. The remote control 10 generates the modulated control beam 14 upon user selection of one of the buttons on a control button keypad 24. The manner in remote control unit 10 modulates its control beam depends on which of the control buttons 24 the user selects. Thus, for example, in response to selection by the user of the particular button on the control button keypad 24 associated with a channel change, the remote control unit 10 modulates the control beam 14 to generate a beam to initiate a channel change on the selected information appliance.

Figure 2:
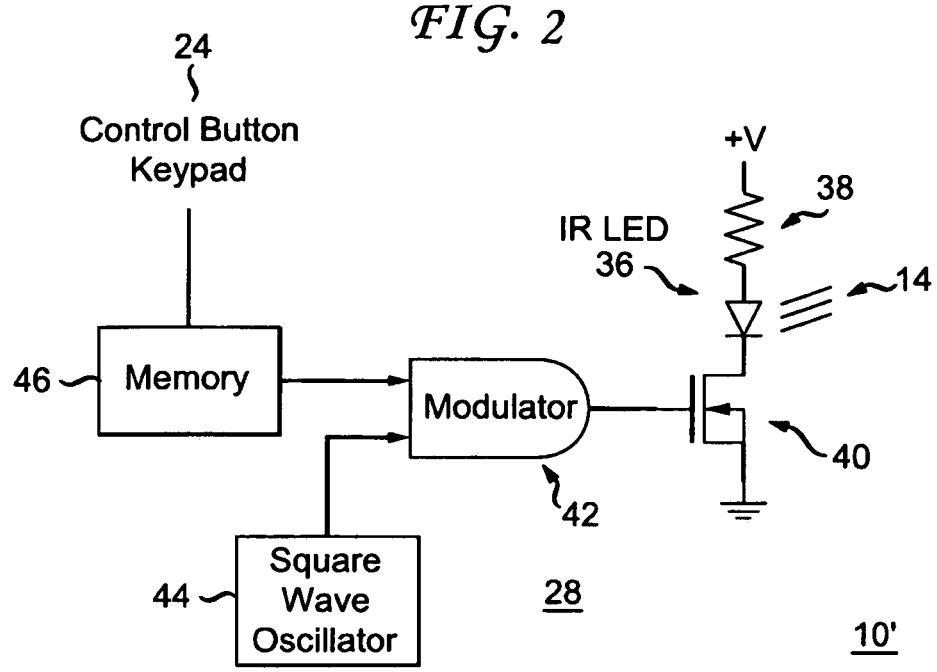
FIG. 2 depicts a schematic diagram of a portion of the remote control unit of FIG. 1.
Figure 2:
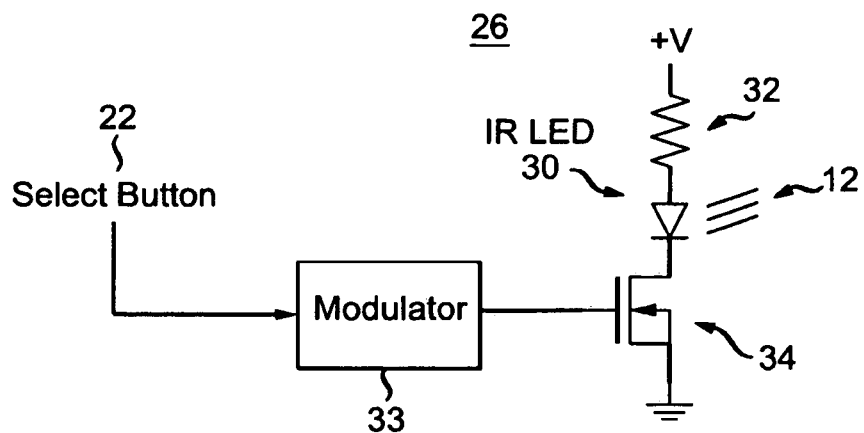

FIG. 2 depicts a schematic diagram of first and second beam generating sections 26 and 28 within remote control unit 10 of FIG. 1 for generating the select beam 12 and the control beam 14, respectively. The first beam generating section 26 comprises a Light Emitting Diode (LED) 30 coupled between a supply voltage +V and circuit ground through the serial combination of a dropping resistor 32 and a switching element 34, typically in the form of a field effect transistor. To energize the LED 30, a user activates the select button 22 (as best illustrated in FIG. 1), to activate a modulator 33, to drive a turn-on voltage to the switching device 34 of FIG. 2 to energize the LED 30, causing the LED to emit a modulated infrared light signal collimated by a lens (not shown) to yield the select beam 12. Modulator 33 provides a unique signature to the select beam to prevent devices from being selected by stray infrared light or other remote control signals. This signature could be as simple as a unique square wave frequency, or a code modulated by a square wave frequency as illustrated in 28. By pointing the remote control unit 10 of FIG. 1 at a desired one of the information appliances $16_1$-$16_n$, the user can illuminate the desired appliance with the select beam 12 to select the same as described hereinafter.

Like the first beam generating unit 26, the second generating beam unit 28 comprises a Light Emitting Diode (LED) 36 coupled between a supply voltage +V and circuit ground through the serial combination of a dropping resistor 38 and a switching element 40, typically in the form of a field effect transistor. The switching element 40 is controlled by a modulator 42, which typically takes the form of an AND gate whose first and second inputs receive the output signal of a square wave oscillator 44 and the output signal of a memory 46, respectively. The oscillator 44 generates a square wave signal at a frequency of between 37 and 44 KHz, thus causing the modulator 42 to modulate the signal at its second input (i.e., the output signal of the memory) at the frequency of the oscillator.

The memory 46 stores a set of codes, each in the form of a digital string that represents a particular command for controlling a functionality of a selected information appliance. To control a desired functionality of the selected information appliance, the user actuates the corresponding button on the control button keypad 24 of FIG. 1. Actuation of the particular functionality button on the control button keypad 24 causes the memory 46 of FIG. 2 to read out and supply to the modulator 42 the stored code associated with that functionality for the selected information appliance. The modulator 42 modulates the control code read out from the memory 46 in accordance with the output signal of the square wave oscillator 44. In this way, the switching device 40 modulates the LED 36, causing the LED 36 to emit modulated infrared light. A lens (not shown) collimates the modulated infrared light to yield the modulated control beam 14.

In practice, a single infrared emitter (not shown) within the remote control unit 10 could generate both the select beam 12 and the modulated control beam 14. However, generating the select and modulated control beams 12 and 14, respectively, as separate beams allows the select beam to have very narrow beam width as compared to the control beam. Making the select beam 12 narrow (e.g., a 10 degree beam width) reduces the likelihood that a user will inadvertently select two of more information appliances when the user points the beam at a desired appliance. Conversely, making the beam width of the control beam relatively broad (e.g., a 60 degree beam width) assures that the user can control the selected information appliance even if the user does not point the remote control device directly at that appliance.

The select beam 12 and the modulated control beam 14 need not lie in the infrared spectrum. For example, the select beam 12 and the modulated control beam 14 could lie in the RF spectrum. Under such circumstances, the selectivity afforded by narrowing the beam width would likely not be possible in the case of an RF frequency select beam. However, other techniques could be employed, such as using a directional microwave antenna for the select beam. One could also use IR for the select beam and RF for the control.

Figure 3:
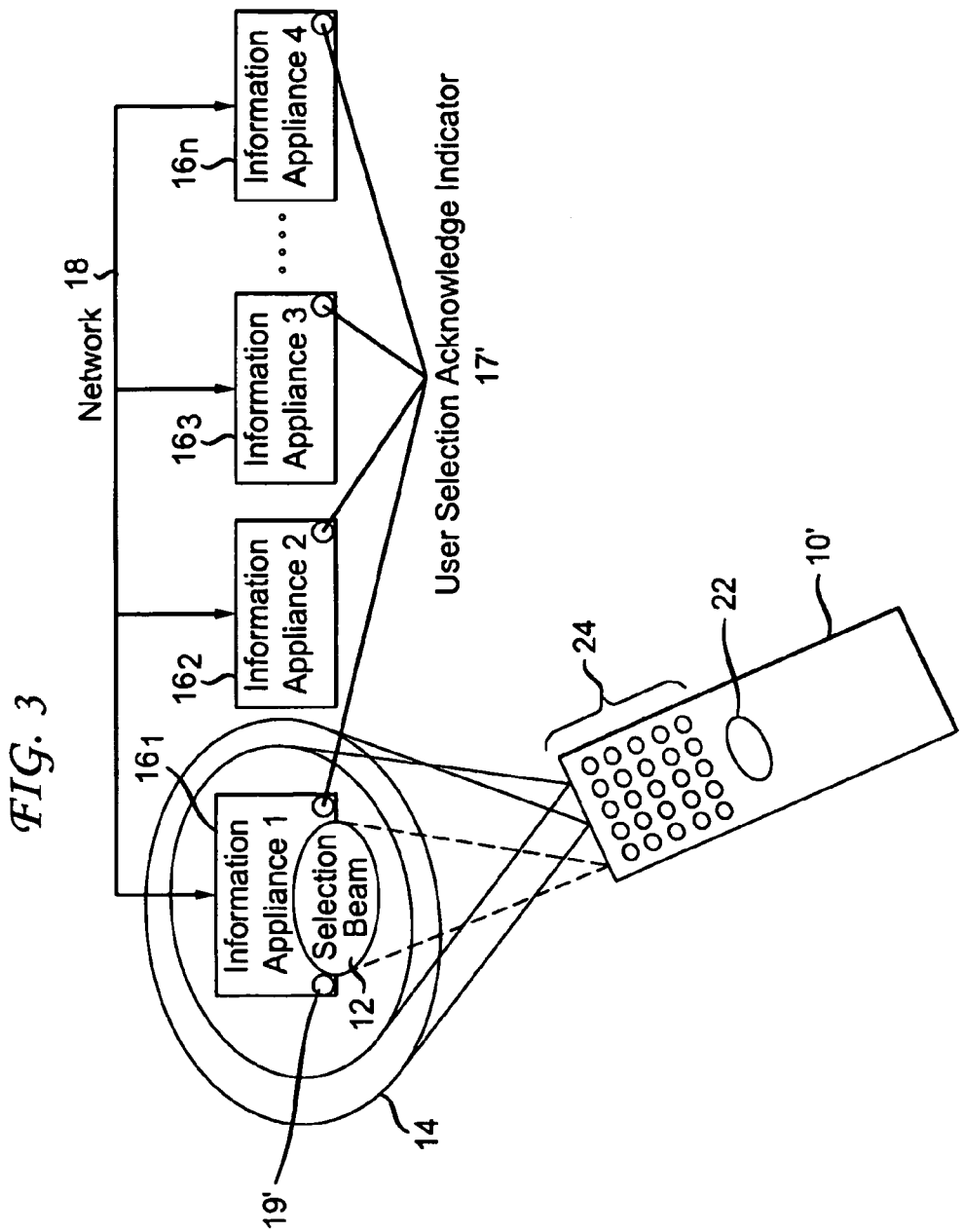
FIG. 3 depicts a block schematic diagram of a second embodiment of a remote control unit for controlling a plurality of information appliances.

FIG. 3 depicts an alternate preferred embodiment 10' of the remote control unit. Like the remote control unit 10 of FIG. 1, the remote control unit 10' of FIG. 3 generates a select beam 14 upon user actuation of the select button 22 for selecting one of the information appliances $16_1$-$16_n$ linked to each other by a network 18. Similarly, the remote control unit 10' of FIG. 3 also generates the modulated control beam 14 in accordance with actuation of a corresponding one of the buttons on the control button keypad 24 for controlling the functionality of the selected information appliance. By comparison to the remote control unit 10 of FIG. 1, the remote control unit 10' includes circuitry (not shown) for receiving an acknowledgement signal generated by an acknowledge IR emitter 19' on the information appliance illuminated by the select beam 12. The acknowledgement signal from the illuminated information appliance typically uniquely identifies the appliance. As described in greater detail with respect to the flow chart of FIG. 8, the receipt by the remote control unit 10' of FIG. 3 of the acknowledgement signal generated by the acknowledge IR emitter 19' on the illuminated information appliance allows the user to confirm the selection.

As compared to the network 18 of FIG. 1, the network 18 of FIG. 3 has no outboard controller 20. Instead, at least one or more of the information appliance $16_1$-$16_n$ has the capability of acting as a controller for other appliances. As will become better understood hereinafter, whether the network 18 has an outboard controller in the form of controller 20 of FIG. 1 or one or more of the information appliances serves as a controller, a mechanism exists to arbitrate as among multiple controllers as described hereinafter.

Figure 5B:
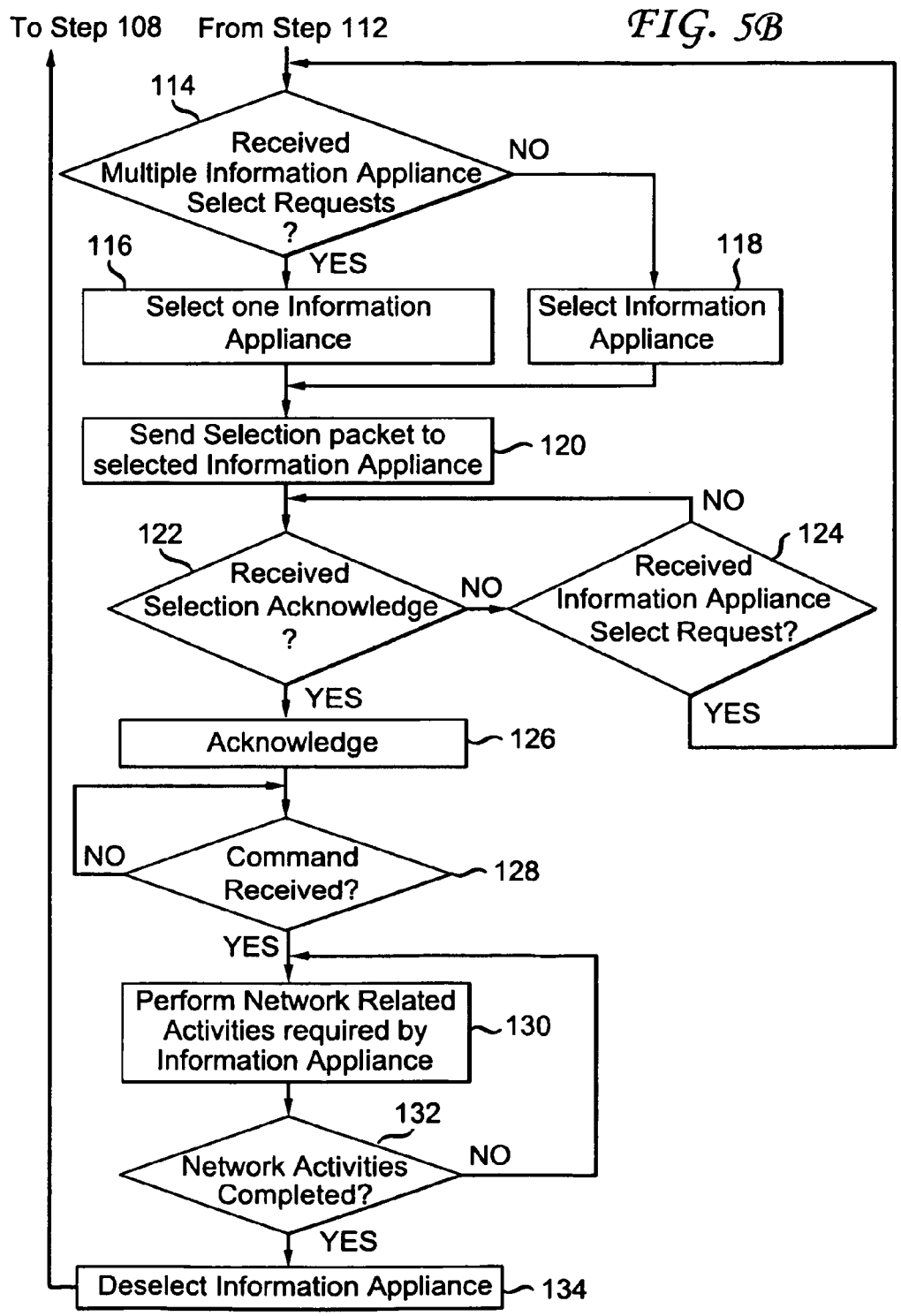

The operation of the remote control 10 of FIG. 1 to select one of the information devices $16_1$-$16n$ can best be understood by reference to FIGS. 5A and 5B which collectively depict in flow chart form the steps executed by a controller, typically the controller 20 of FIG. 1. At the outset of operation (for example, during power up), all potential central controllers on the network 18 (including the controller 20) broadcast a service packet during step 100. Having each of the potential controllers broadcast a service packet provides an indication of whether more than one controller exists to enable selection of a single controller, thereby avoiding conflicts. Although the embodiment of FIG. 1 depicts a dedicated controller in the form of controller 20, one of more information appliances $16_1$-$16_n$ could operate as a controller as discussed previously, giving rise to the need to determine which controller should serve as the master.

Following step 100, the controller 20 of FIG. 1 checks for receipt of a broadcast packet from another controller during step 102 of FIG. 5A. If the controller 20 has received a broadcast service packet, then the controller 20 determines during step 104 that it will not serve as a master, and thereby takes no further action. Should the controller 20 receive no broadcast service packets during step 102, then step 106 undergoes execution and the controller 20 operates as the master and proceeds to build a table identifying information appliances existing on the network 18 of FIG. 1 based on hand-shaking requests from such information appliances. Next, the controller 20 executes step 108 of FIG. 5A to determine whether it should send a service packet in order to complete the responses in the table. Typically, the controller 20 sends such service packets on a periodic basis. In this way, the controller will check during step 108 whether a sufficient time has elapsed from the last time the controller sent a service to decide whether to send a new packet. If a sufficient time has elapsed, then the controller 20 sends the service packet during step 110 prior to execution of step 112 at which time the controller checks for receipt of a service packet from an information appliance. Step 112 will undergo execution directly following step 108 if the controller determines that insufficient time has elapsed since sending the prior service packet.

Figure 4:
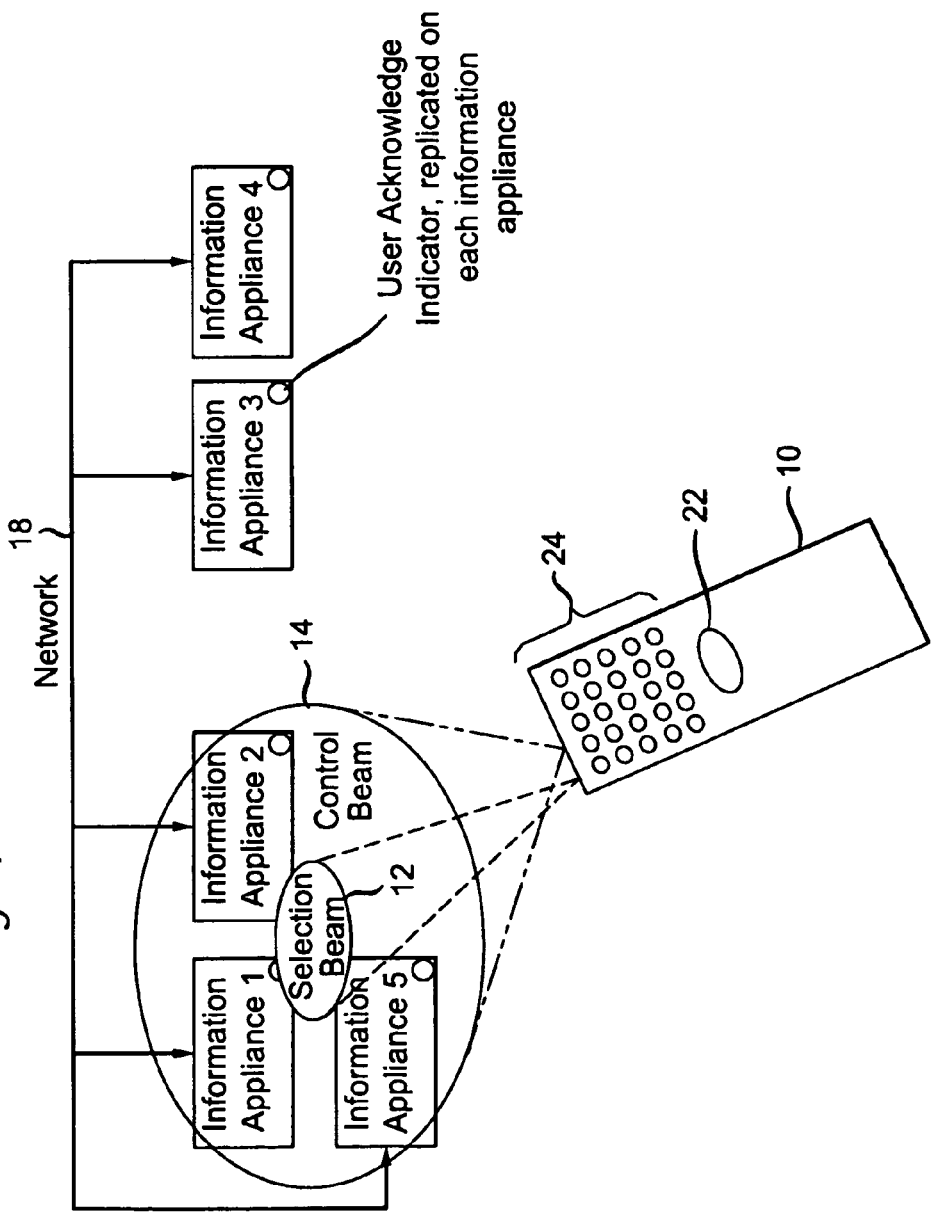
FIG. 4 depicts multiple appliance selection in the embodiments of FIGS. 1 and 2.

During step 114, the controller 20 then checks for the receipt of multiple selection requests. As discussed above with respect to FIG. 1, a user selects one of the information appliance 16₁-16ₙ of FIG. 1) by pointing the remote control unit 10 to illuminate the desired information appliance with the select beam 12 of FIG. 1. Depending on the proximity of information appliances to each other, a user could illuminate two or more information appliances, thus selecting two or more information appliances as depicted in FIG. 4. Under such circumstances, each such selected information appliance would send the controller a request to be selected based on receipt of the select beam. As illustrated in FIG. 4, if multiple information appliances lie in close proximity to each other, a user could inadvertently illuminate more than one information appliance at one time with the select beam 12 even though the user only sought to select a single device. If the controller has received multiple selection requests during step 114 of FIG. 5, then step 116 undergoes execution and the controller 20 selects a single information appliance.

The controller 20 can use various algorithms to select a single information appliance if the user has selected more than one such appliance. For example, the controller 20 could maintain a hierarchy of information appliances, and thus would select the highest order information appliance. For example, in the case of user selection of both a set top box and a DVD player, the controller 20 might always choose the set-top box, assuming it has priority. Another possible approach would have the controller 20 determine, as among selected information appliances, which appliance had been chosen previously, and choose that one again. Alternatively, the controller could choose not to select the same information appliance in succession.

If the controller 20 of FIG. 1 only receives a single request for selection of an information appliance during step 114 of FIG. 5, then the controller selects that device during step 118. Following execution of either of steps 116 or 118, the controller 20 sends a selection request acknowledgement to the selected information appliance during step 120. The controller 20 checks during step 122 for an acknowledgement from the selected information appliance. If the selected information appliance has not received the acknowledgement, then the controller executes step 124 to monitor for a selection request. In the absence of a selection request, the controller re-executes step 122. Otherwise, should the controller 20 receive a selection request from an information appliance, then the controller proceeds to re-execute step 114.

Should the controller 20 of FIG. 1 receive an acknowledgement during step 122 of FIG. 5, the controller returns an acknowledgement during step 126. Thereafter, the controller 20 checks for receipt of a control command acknowledgement from the selected network appliance after that appliance had received a control command from the remote control unit 10 of FIG. 1. 1. In the absence of the receipt of a control command, the controller 20 will re-execute step 126 of FIG. 5.

Upon detecting the receipt of a control command acknowledgement during step 128, the controller 20 will perform the necessary network-related activities associated with that command during step 130. Depending on the type of control command it receives, the selected information appliance might need to communicate with other information appliances on the network 18 of FIG. 1. For example, the user could select an information appliance containing stored content for use by another information appliance, and thereafter send the selected appliance a command to download the content to the destination appliance. Under such circumstances, the controller 20 would take the necessary steps to link the selected information appliance to the information appliance destined to receive the content. After step 130, the controller 20 checks during step 132 for completion of such network activities. If such activities remain ongoing, step 130 undergoes re-execution. Otherwise, the controller proceeds to step 132 and deselects the previously selected information appliance before proceeding to re-execute step 106.

Figure 6A:
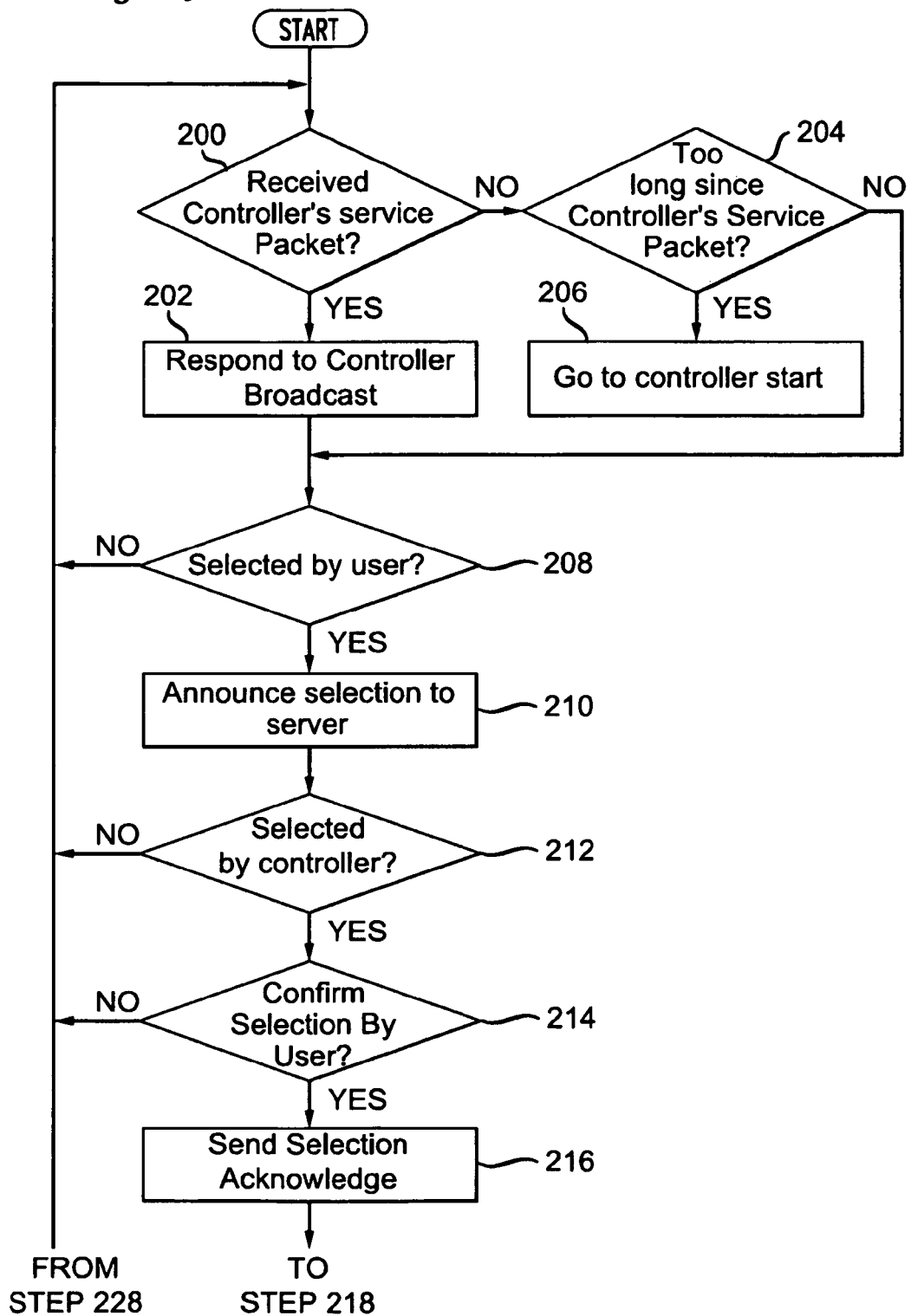
FIGS. 6A and 6B collectively depict in flow chart form the steps of a method executed by an individual one of the information appliances of FIG. 1 under the management of a controller.
Figure 6B:
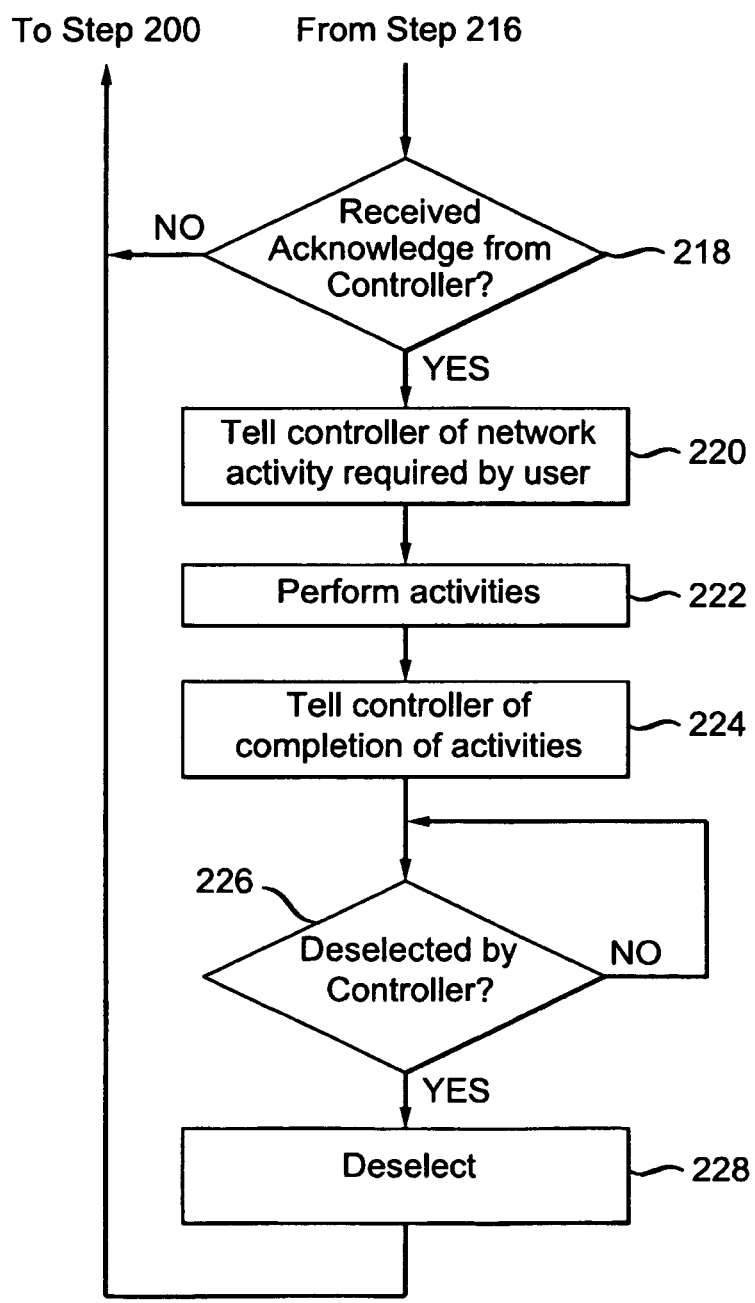

As discussed above, the controller 20 facilitates communications as among the information appliances 16₁-16ₙ of FIG. 1 responsive to commands received by one or more appliances via the remote control unit 10 of FIG. 1. The manner in which an information appliance interacts with the controller 20 can best be understood by reference to FIGS. 6A and 6B which collectively depict in flow chart form the interaction between an information appliance and the controller. The method of FIGS. 6A and B commences with execution of step 200 during which an information appliance checks for receipt of the service packet from the controller. If the information appliance has received the service packet, the information appliance executes step 202 during which the information appliance responds to the controller.

If during step 200, the information appliance has not received the information packet, then the information controller checks during step 204 whether the time since receipt of the last service packet exceeds a prescribed interval. As discussed, each controller on the network 18 of FIG. 1, for example controller 20, generates service packets at periodic intervals. Thus, the information appliances should receive such service packets regularly. Thus, if an information appliance does not receive a service packet, one of the information appliances will need to become a controller during step 206, assuming it possess such functionality.

Following either of steps 202 or 206, the information appliance executes step 208 during which the appliance checks whether not it has been selected by the user. If selected, the information appliance announces that selection during step 210. Otherwise, the information appliance re-executes step 200. Following step 210, the information appliance checks whether it has been selected by the controller following selection by the user during step 212. As discussed previously, a user could inadvertently select more than one information appliance. Under such circumstances, the controller 20 will need to select as among the user selected information appliances. Upon being selected by the controller 20, the now-selected information appliance executes step 214. Otherwise, the information appliance re-executes step 200. During step 214, the information appliance checks for a confirmation signal from the user. As discussed previously, in the event a user selects more than one information appliance, the controller 20 will select as among the selected information appliances. When selecting as among the selected information appliances, the controller 20 might not necessarily choose the information appliance actually desired by the user. Thus, after the controller 20 selects as among the selected information appliances, the controller will provide a notification to the user who will enter a confirmation, such as by pressing an associated button on the control button key pad 24 of FIG. 1, when the controller has selected the user-desired information appliance.

Upon receiving the user-entered confirmation, the selected information appliance will then execute step 216. Otherwise, step 200 undergoes re-execution. During step 216, the selected information appliance sends a selection acknowledgement signal to the controller 20. The selection acknowledgement signal comprises an electrical signal carried by the network from the information appliance to the controller 20. Thereafter, the information checks during step 218 for an acknowledgement receipt from the controller 20. Upon receipt of an acknowledgement receipt, the information appliance executes step 220. Otherwise, the information appliance re-executes step 200.

During step 220, the selected information appliance informs tells the controller 20 of the network activities required by the command received from the user. Thereafter, the information appliance performs the activities required by the user command during step 222 and upon completion of such activities; the selected information appliance notifies the controller 20 of such completion during step 224. Thereafter, the selected information appliance checks for de-selection command during step 226. If no de-selection has command has been received, the information appliance re-executes step 226. Upon receipt of the de-selection command, the information appliance de-selects itself before returning to step 200.

While the methods depicted in FIGS. 5A and 5B and 6A and 6B have been described with respect to the outboard controller 20, the methods apply equally to an internal controller, e.g., a controller within one of the information appliances 16₁-16ₙ. Such an internal controller would perform all of the activities performed by the outboard controller 20.

Figure 7:
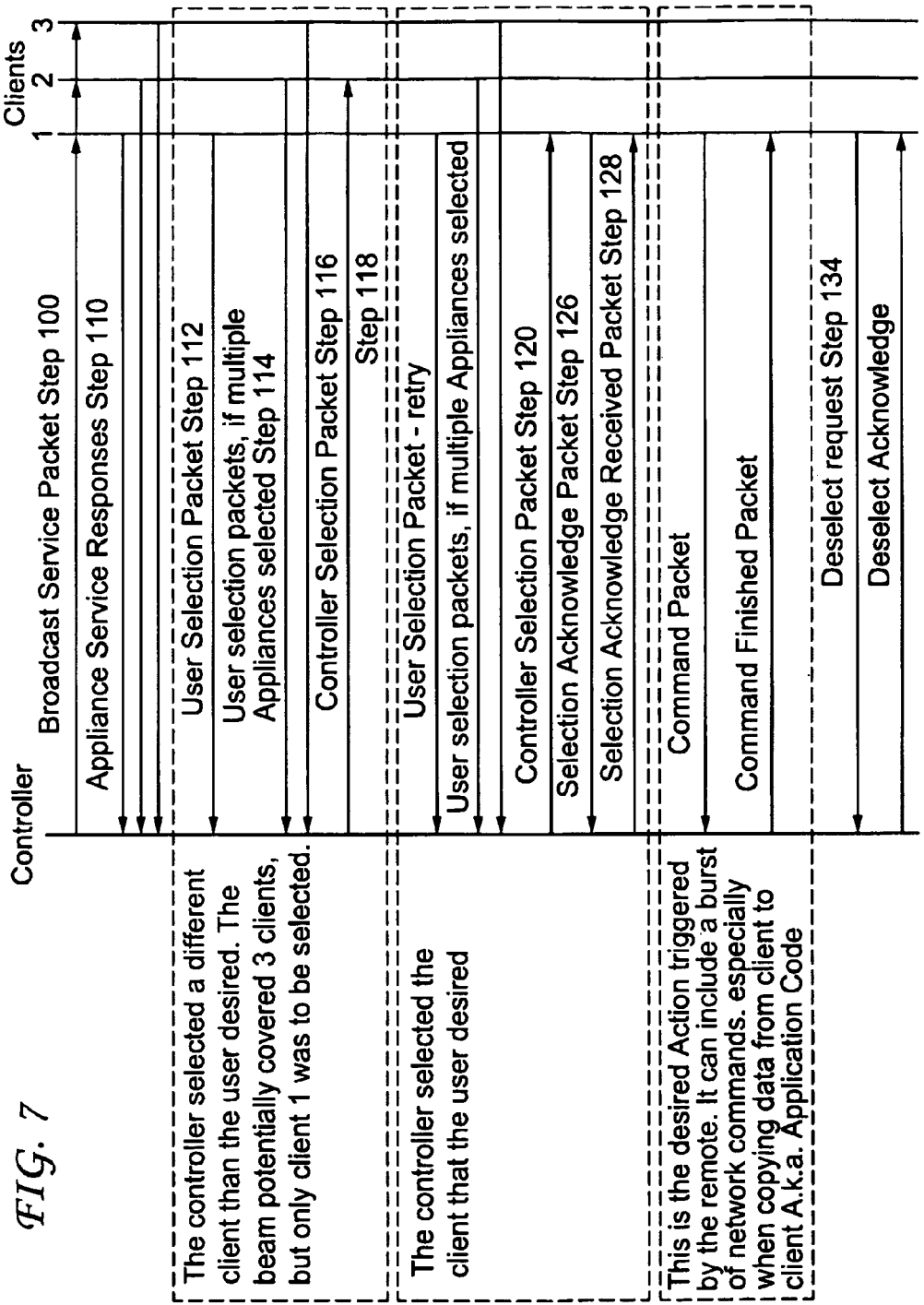
FIG. 7 depicts a timing protocol for interactions between a controller and an information appliance of FIGS. 1 and 2.

FIG. 7 depicts a protocol diagram showing the timing relationship between the activities of the controller 20 and the responses of the information appliances. Each activity depicted in FIG. 7 which results from execution of an associated step(s) in FIGS. 5 and 6 bears the label of such step(s).

Figure 8:
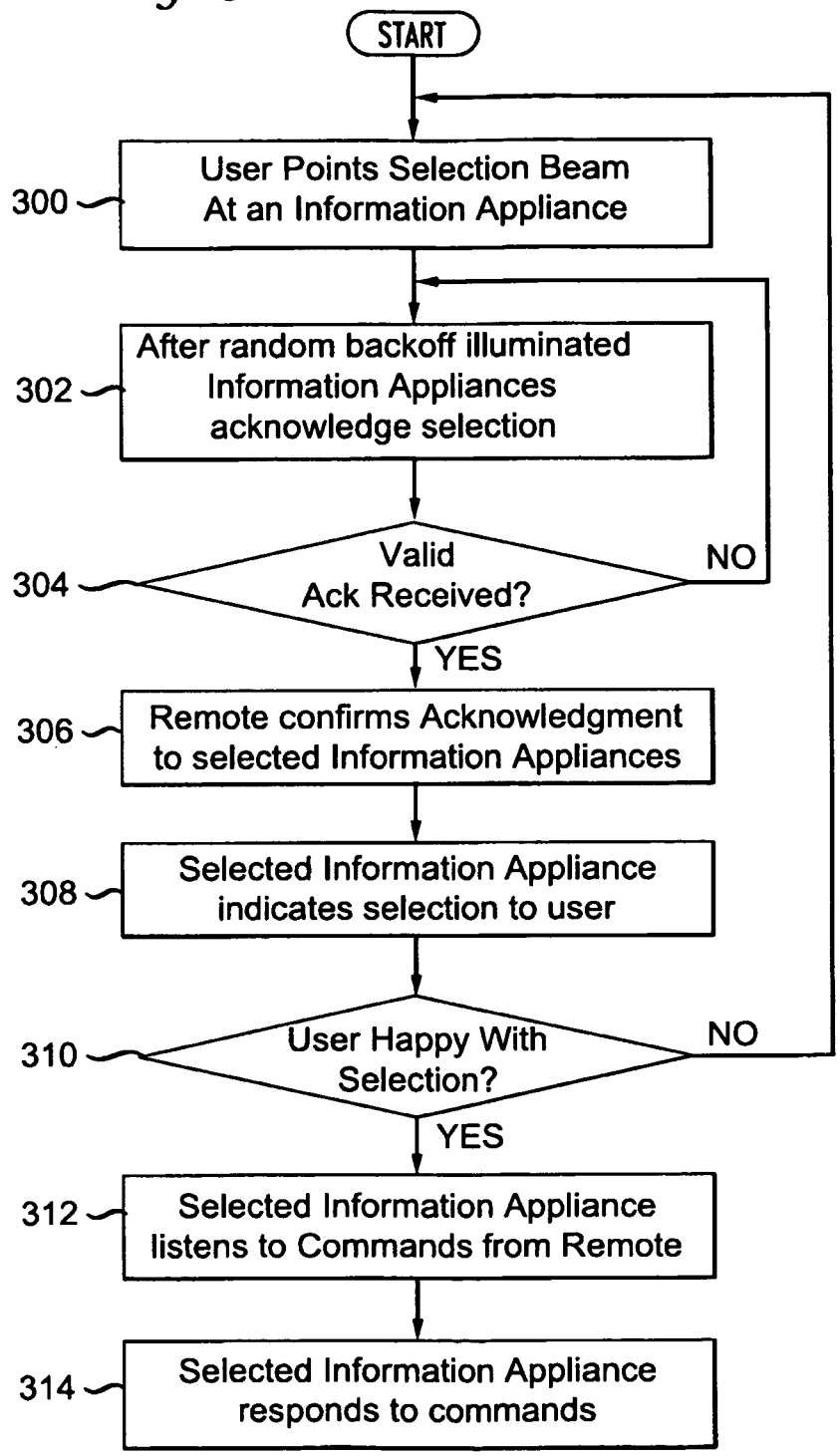
FIG. 8 depicts in flow chart form the steps of a method executed by an individual one of the information appliances in response to control by the remote control unit of FIG. 3.

FIG. 8 depicts in flowchart of the steps of the steps of a method for selecting one of the information appliances 16₁-16ₙ by the remote control unit 10' of FIG. 3. The method of FIG. 8 commences when the user points the select beam 12 at a desired one of the information appliances 16₁-16ₙ of FIG. 3 during step 300 of FIG. 8. After some random period, the illuminated information appliance(s) will acknowledge selection by transmitting to the remote control unit 10' of FIG. 3 an acknowledgement signal via the acknowledge IR emitter 19' of FIG. 3 during step 302 of FIG. 8. The remote control unit 10 of FIG. 3 checks during step 304 of FIG. 8 for receipt of a valid acknowledgement signal from an illuminated information appliance. If the remote control 10 of FIG. 1 receives a valid acknowledgement signal, then the remote control will confirm the receipt of the valid acknowledgement signal during step 306. Otherwise, step 302 undergoes re-execution.

Following step 306, the selected information appliance(s) indicate their selection to the user during step 308. Based on which information appliances indicate their selection, the user will decide during step 310 whether to approve of the selection and then proceed to send a command to the selected information appliance which listens for such a command during step 312. The information appliance executes the command during step 314. If the user is not happy with the selection, step 300 and those following it undergo re-execution.

The foregoing describes a technique for selecting an information appliance by pointing a remote control thereat to illuminate the information appliance.

The invention claimed is:

1. A method for controlling by a controller a plurality of devices coupled to the controller across a network, comprising:
    determining at the controller whether multiple devices or a single device have each received an electromagnetic radiation beam from a user for selecting a device by determining if an acknowledgement in the form of an electrical signal was received from more than the one device, and if multiple devices have each received a beam, then
    selecting from among the multiple devices that each have received an electromagnetic radiation beam, a single device to receive control signals; and
    performing at the controller at least one network-related activity if required by the selected device.

2. The method according to claim 1 wherein a user selects the single device from among the multiple devices that each has received an electromagnetic radiation beam.

3. The method according to claim 1 wherein the controller selects the single device from among the multiple devices that each has received an electromagnetic radiation beam.

4. The method according to claim 1 wherein the selecting step includes choosing from among multiple devices in accordance with a highest priority device.

5. The method according to claim 1 wherein the selecting step includes choosing from among multiple devices in accordance with a previously designated device.

6. The method according to claim 1 further including the step of deselecting the device after the device completes receiving a control signal.

7. A A controller for controlling a plurality of devices coupled to the controller across a network, the controller including a processor configured to:
    identify devices coupled to the controller across the network by periodically sending out service packets to the devices;
    determine whether multiple identified devices or a single identified device has each received an electromagnetic radiation beam from a user for selecting an identified device by determining if an acknowledgement in the form of an electrical signal was received from more than the one device, and if multiple devices have each received an electromagnetic beam, then
    select from among the multiple devices that each has received an electromagnetic radiation beam, a single device to receive control signals.

8. The controller according to claim 7 wherein the processor selects the single identified device from among the multiple identified devices that each has received an electromagnetic radiation beam.

9. The controller according to claim 7 wherein the processor chooses from among the multiple identified devices in accordance with an identified device having highest priority.

10. The controller according to claim 7 wherein the processor chooses from among multiple identified devices in accordance with an identified device that was designated previously.

11. The controller according to claim 7 wherein the processor deselects the selected identified device after said device completes receiving a control signal.

* * * * *